(12) United States Patent
Takahashi et al.

(10) Patent No.: US 12,534,770 B2
(45) Date of Patent: Jan. 27, 2026

(54) STEELMAKING LINE AND METHOD OF PRODUCING REDUCED IRON

(71) Applicant: JFE STEEL CORPORATION, Tokyo (JP)

(72) Inventors: Koichi Takahashi, Tokyo (JP); Sumito Ozawa, Tokyo (JP); Yuki Kawashiri, Tokyo (JP); Yuya Morita, Tokyo (JP); Taihei Nouchi, Tokyo (JP); Michitaka Sato, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 525 days.

(21) Appl. No.: 17/995,310

(22) PCT Filed: Jan. 6, 2021

(86) PCT No.: PCT/JP2021/000237
§ 371 (c)(1),
(2) Date: Oct. 3, 2022

(87) PCT Pub. No.: WO2021/220555
PCT Pub. Date: Nov. 4, 2021

(65) Prior Publication Data
US 2023/0175084 A1    Jun. 8, 2023

(30) Foreign Application Priority Data

Apr. 27, 2020 (JP) ................................ 2020-078526

(51) Int. Cl.
*C21B 5/06* (2006.01)
*C21B 7/00* (2006.01)
(Continued)

(52) U.S. Cl.
CPC ............... *C21B 5/06* (2013.01); *C21B 7/002* (2013.01); *C21B 13/0073* (2013.01); *F27D 17/00* (2013.01); *C21B 2005/005* (2013.01)

(58) Field of Classification Search
CPC ....... C21B 5/06; C21B 7/002; C21B 13/0073; C21B 2005/005; C21B 5/001;
(Continued)

(56) References Cited

U.S. PATENT DOCUMENTS

| 4,889,323 A | 12/1989 | Pusch et al. |
| 6,045,602 A * | 4/2000 | Shah ................. F25J 3/0252 |
| | | 75/505 |

(Continued)

FOREIGN PATENT DOCUMENTS

| CN | 86105271 A | 4/1987 |
| CN | 1430678 A | 7/2003 |

(Continued)

OTHER PUBLICATIONS

Jan. 19, 2024, Office Action issued by the China National Intellectual Property Administration in the corresponding Chinese Patent Application No. 202180029381.4 with English language search report.

(Continued)

*Primary Examiner* — Jessee R Roe
*Assistant Examiner* — Michael Aboagye
(74) *Attorney, Agent, or Firm* — KENJA IP LAW PC (57) ABSTRACT

Provided is a steelmaking line contributing to the realization of a method that achieves energy saving and $CO_2$ emission reduction when producing reduced iron from iron oxide. The steelmaking line comprises: a blast furnace configured to reduce iron oxide; a reducing furnace configured to reduce iron oxide; a methane synthesizer configured to synthesize methane from blast furnace gas and/or furnace top gas, and (Continued)

hydrogen gas; a blower configured to blow the methane gas synthesized by the methane synthesizer into the blast furnace; a heat-reformer configured to heat or heat-reform the blast furnace gas and/or the furnace top gas, and the methane gas synthesized by the methane synthesizer, to generate reducing gas; a reducing gas blower configured to blow the reducing gas into the reducing furnace; and a supply path configured to supply the furnace top gas to the methane synthesizer and/or the heat-reformer.

11 Claims, 6 Drawing Sheets

(51) Int. Cl.
  *C21B 13/00* (2006.01)
  *F27D 17/00* (2025.01)
  *C21B 5/00* (2006.01)
(58) Field of Classification Search
  CPC ............ C21B 2100/22; C21B 2100/26; C21B 2100/282; C21B 2100/44; C21B 2100/64; C21B 2100/80; C21B 5/00; F27D 17/00; F27D 17/20; Y02P 10/122; Y02P 10/143
  USPC ................................................ 266/156, 186
  See application file for complete search history.

(56) References Cited

U.S. PATENT DOCUMENTS

| | | | |
|---|---|---|---|
| 6,986,800 B2 * | 1/2006 | Duarte-Escareno | .... C21C 5/285 75/458 |
| 8,926,729 B2 | 1/2015 | Iijima et al. | |
| 9,181,595 B2 | 11/2015 | Millner et al. | |
| 9,938,595 B2 * | 4/2018 | Becerra-Novoa | ....... C21B 13/02 |
| 10,526,670 B2 | 1/2020 | Kuhl | |
| 2004/0168549 A1 | 9/2004 | Kobayashi et al. | |
| 2004/0216560 A1 | 11/2004 | Kepplinger et al. | |
| 2011/0314966 A1 | 12/2011 | Iijima et al. | |
| 2014/0202285 A1 | 7/2014 | Millner et al. | |
| 2015/0259759 A1 | 9/2015 | Wolfmeir et al. | |
| 2016/0153316 A1 | 6/2016 | Bergins et al. | |
| 2017/0058373 A1 | 3/2017 | Motamedhashemi | |
| 2019/0323098 A1 | 10/2019 | Handagama et al. | |

FOREIGN PATENT DOCUMENTS

| | | | | |
|---|---|---|---|---|
| CN | 1620516 | A | 5/2005 | |
| CN | 101100701 | A | 1/2008 | |
| CN | 102758048 | A | 10/2012 | |
| CN | 102782161 | A | 11/2012 | |
| CN | 103781724 | A | 5/2014 | |
| CN | 104662175 | A | 5/2015 | |
| CN | 107128876 | A | 9/2017 | |
| CN | 110199033 | A | 9/2019 | |
| EA | 029710 | B1 | 5/2018 | |
| EP | 0209861 | A2 | 1/1987 | |
| EP | 2543743 | A1 * | 1/2013 | ............ C01B 32/40 |
| EP | 2543743 | B1 | 11/2017 | |
| EP | 3027778 | B1 | 4/2021 | |
| JP | S6342320 | A | 2/1988 | |
| JP | 2011225969 | A | 11/2011 | |
| JP | 2012007213 | A | 1/2012 | |
| JP | 2017088912 | A | 5/2017 | |
| JP | 6190522 | B2 | 8/2017 | |
| KR | 1020150004313 | A | 1/2015 | |
| KR | 1020160030559 | A | 3/2016 | |
| RU | 2528525 | C2 | 9/2014 | |
| RU | 2532757 | C2 | 11/2014 | |
| RU | 2546266 | C2 | 4/2015 | |
| TW | 201700733 | A | 1/2017 | |
| WO | 2011012964 | A2 | 2/2011 | |

OTHER PUBLICATIONS

Aug. 16, 2024, Office Action issued by the Korean Intellectual Property Office in the corresponding Korean Patent Application No. 10-2022-7039871 with English language concise statement of relevance.

Aug. 19, 2021, Office Action issued by the Taiwan Intellectual Property Office in the corresponding Taiwanese Patent Application No. 110100903 with English language Concise Statement of Relevance.

Mar. 9, 2021, International Search Report issued in the International Patent Application No. PCT/JP2021/000237.

Jun. 22, 2023, Office Action issued by the Federal Service for Intellectual Property, Patents and Trademarks of the Russian Federation in the corresponding Russian Patent Application No. 2022130165 with English language search report.

Jul. 26, 2023, the Extended European Search Report issued by the European Patent Office in the corresponding European Patent Application No. 21797227.2.

Apr. 25, 2025, Office Action issued by the Korean Intellectual Property Office in the corresponding Korean Patent Application No. 10-2022-7039871 with English language concise statement of relevance.

* cited by examiner

STEELMAKING LINE AND METHOD OF PRODUCING REDUCED IRON

TECHNICAL FIELD

The present disclosure relates to a steelmaking line and a method of producing reduced iron using the steelmaking line.

BACKGROUND

In recent years, energy saving and carbon dioxide ($CO_2$) emission reduction are strongly needed in various fields because of global environmental issues and fossil fuel depletion issues. This is also the case in steelworks, and energy-saving efforts are made in each process in steelworks.

Main raw material of iron is iron oxide, and a reduction process of reducing iron oxide is essential in steelworks. A typical reduction process most commonly used in the world is a blast furnace. In the blast furnace, coke and pulverized coal are reacted with oxygen in hot air (air heated to about 1200° C.) in a tuyere to generate CO and $H_2$ gases (reducing gas), and iron ore and the like in the furnace are reduced using the reducing gas. As a result of improvement in blast furnace operation technology in recent years, the reducing agent rate (the amount of coke and pulverized coal used per 1 t of hot metal production) has been reduced to about 500 kg/t. Further significant reduction of the reducing agent rate cannot be expected as the reduction of the reducing agent rate has reached its limit.

In regions where natural gas is produced, the following method is often used: Agglomerated iron ore such as sintered ore or pellets (hereafter collectively referred to as "iron oxide") is charged into a vertical reducing furnace as iron oxide raw material, and reducing gas containing hydrogen and carbon monoxide is blown into the reducing furnace to reduce the iron oxide and produce reduced iron. In this method, for example, natural gas is used as raw material gas of the reducing gas. The raw material gas is heated and reformed in a reformer together with furnace top gas discharged from the furnace top of the reducing furnace, to generate the reducing gas. The generated reducing gas is blown into the reducing furnace and reacts with the iron oxide raw material supplied from the upper part of the reducing furnace, as a result of which the iron oxide is reduced and the reduced iron is produced. The produced reduced iron is discharged from the lower part of the reducing furnace. The gas that has been used to reduce the iron oxide is discharged from the furnace top of the reducing furnace as the furnace top gas and subjected to dust collection and cooling. After this, part of the furnace top gas is fed into the reformer as raw material of reformed gas, and the remaining furnace top gas is used as fuel gas in the heat-reformer.

As the foregoing reduced iron production process, for example, JP 2017-88912 A (PTL 1) describes a method of reforming exhaust gas of a reducing furnace and natural gas in a reformer to generate reducing gas mainly composed of CO and $H_2$ gases and blowing the reducing gas into the reducing furnace to reduce iron oxide in the reducing furnace and produce reduced iron.

JP 6190522 B2 (PTL 2) describes a method of reforming coke oven gas and furnace top gas of a reducing furnace from which $CO_2$ has been removed to generate reducing gas and blowing the reducing gas into the reducing furnace to produce reduced iron.

CITATION LIST

Patent Literature

PTL 1: JP 2017-88912 A
PTL 2: JP 6190522 B2

SUMMARY

Technical Problem

The reduced iron production method described in PTL 1 uses natural gas for reducing gas production, and therefore $CO_2$ emissions are unavoidable to a certain degree although it is less than that of the blast furnace.

The method described in PTL 2 produces reducing gas using coke oven gas or converter gas generated in steelworks. In integrated steelworks, coke oven gas or converter gas is essential as fuel gas in downstream processes such as a heating furnace and an annealing furnace. Using such gas in the reduced iron production process causes lack of fuel gas in the downstream processes. To compensate for the lack of gas in the downstream processes, natural gas needs to be supplied from outside. This makes it impossible to reduce $CO_2$ emissions.

The method described in PTL 2 reforms coke oven gas as raw material to obtain reducing gas. However, the coke oven gas, because of its high sulfur content, may damage a catalyst accompanying a line involving reaction, such as a reformer. It is considered that appropriate operation in the reduced iron production process is possible if the ratio of $H_2$ and CO is approximately 1.5. Converter gas, however, has low $H_2$ content, and accordingly the value of $H_2/CO$ in the reducing gas generated from the converter gas is excessively low, and does not meet the appropriate operating composition for the reduced iron production process. To avoid this, $CO_2$ needs to be separated from the converter gas, which requires extra energy for $CO_2$ separation.

It could therefore be helpful to provide a method that achieves energy saving and $CO_2$ emission reduction when producing reduced iron from iron oxide, together with a steelmaking line contributing to the realization of the method.

Solution to Problem

Upon careful examination, we discovered the following new production line and method of producing reduced iron.

We thus provide:

1. A steelmaking line comprising: a blast furnace configured to reduce iron oxide; a reducing furnace configured to reduce iron oxide; a methane synthesizer configured to synthesize methane from blast furnace gas and/or furnace top gas, and hydrogen gas, the blast furnace gas being generated from the blast furnace as a by-product and containing carbon dioxide, carbon monoxide, and hydrogen, and the furnace top gas being discharged from a furnace top of the reducing furnace and containing carbon dioxide, carbon monoxide, and hydrogen; a blower configured to blow the methane gas synthesized by the methane synthesizer into the blast furnace; a heat-reformer configured to heat or heat-reform the blast furnace gas and/or the furnace top gas, and the methane gas synthesized by the methane synthesizer, to generate reducing gas containing carbon monoxide gas and hydrogen gas; a reducing gas blower configured to blow the reducing gas into the reducing furnace; and a supply path configured to supply the furnace top gas to the methane synthesizer and/or the heat-reformer.
2. The steelmaking line according to 1, comprising a carbon dioxide separator configured to separate carbon dioxide from the furnace top gas, in the supply path.
3. The steelmaking line according to 1. or 2., comprising: a carbon dioxide gas separation and recovery device configured to separate and recover carbon dioxide gas from the blast furnace gas, on an upstream side of the methane synthesizer; and a path configured to supply the carbon dioxide gas recovered by the carbon dioxide gas separation and recovery device, to the methane synthesizer.
4. A method of producing reduced iron using the steelmaking line according to any one of 1. to 3., the method comprising: charging iron oxide into the reducing furnace; blowing reducing gas into the reducing furnace; synthesizing methane from mixed gas or carbon dioxide gas, and hydrogen gas, the mixed gas containing carbon dioxide and carbon monoxide; heating raw material gas including the methane gas and the mixed gas and reforming the raw material gas to the reducing gas; and reducing the iron oxide by the reducing gas in the reducing furnace.
5. The method of producing reduced iron according to 4., wherein the mixed gas is blast furnace gas generated from the blast furnace as a by-product and/or furnace top gas discharged from the furnace top of the reducing furnace.
6. The method of producing reduced iron according to 5., wherein part of the methane gas synthesized in the synthesizing is blown into the blast furnace.
7. The method of producing reduced iron according to 5, or 6., wherein oxygen gas is used for blasting in the blast furnace.
8. A method of producing reduced iron using the steelmaking line according to any one of 1. to 3., the method comprising: charging iron oxide into the reducing furnace; blowing reducing gas into the reducing furnace; separating carbon dioxide from furnace top gas discharged from the furnace top of the reducing furnace and containing carbon dioxide, carbon monoxide, and hydrogen, and recovering mixed gas containing carbon monoxide and hydrogen; heating raw material gas including the mixed gas to generate the reducing gas; and reducing the iron oxide by the reducing gas in the reducing furnace.
9. The method of producing reduced iron according to 8., wherein methane gas is used as part of the raw material gas.
10. The method of producing reduced iron according to 9., wherein the methane gas is regenerative methane gas obtained by synthesizing methane from part of the furnace top gas and/or part of blast furnace gas, and hydrogen gas, the furnace top gas being discharged from the furnace top of the reducing furnace and containing carbon dioxide, carbon monoxide, and hydrogen, and the blast furnace gas being generated from the blast furnace as a by-product and containing carbon dioxide, carbon monoxide, and hydrogen, and part of the regenerative methane gas is blown into the blast furnace.
11. The method of producing reduced iron according to 10., wherein oxygen gas is used for blasting in the blast furnace.

Advantageous Effect

While conventionally natural gas is used to generate reducing gas for iron oxide raw material, our techniques synthesize methane from mixed gas containing carbon dioxide and carbon monoxide or carbon dioxide gas, and hydrogen gas, heat raw material gas including the methane gas and the mixed gas to generate reducing gas, and use the reducing gas for an iron oxide reduction process. Thus, a reduced iron production process using, for example, blast furnace gas can be achieved, so that the $CO_2$ emissions in the reduced iron production process can be reduced significantly.

DETAILED DESCRIPTION

Figure 1:
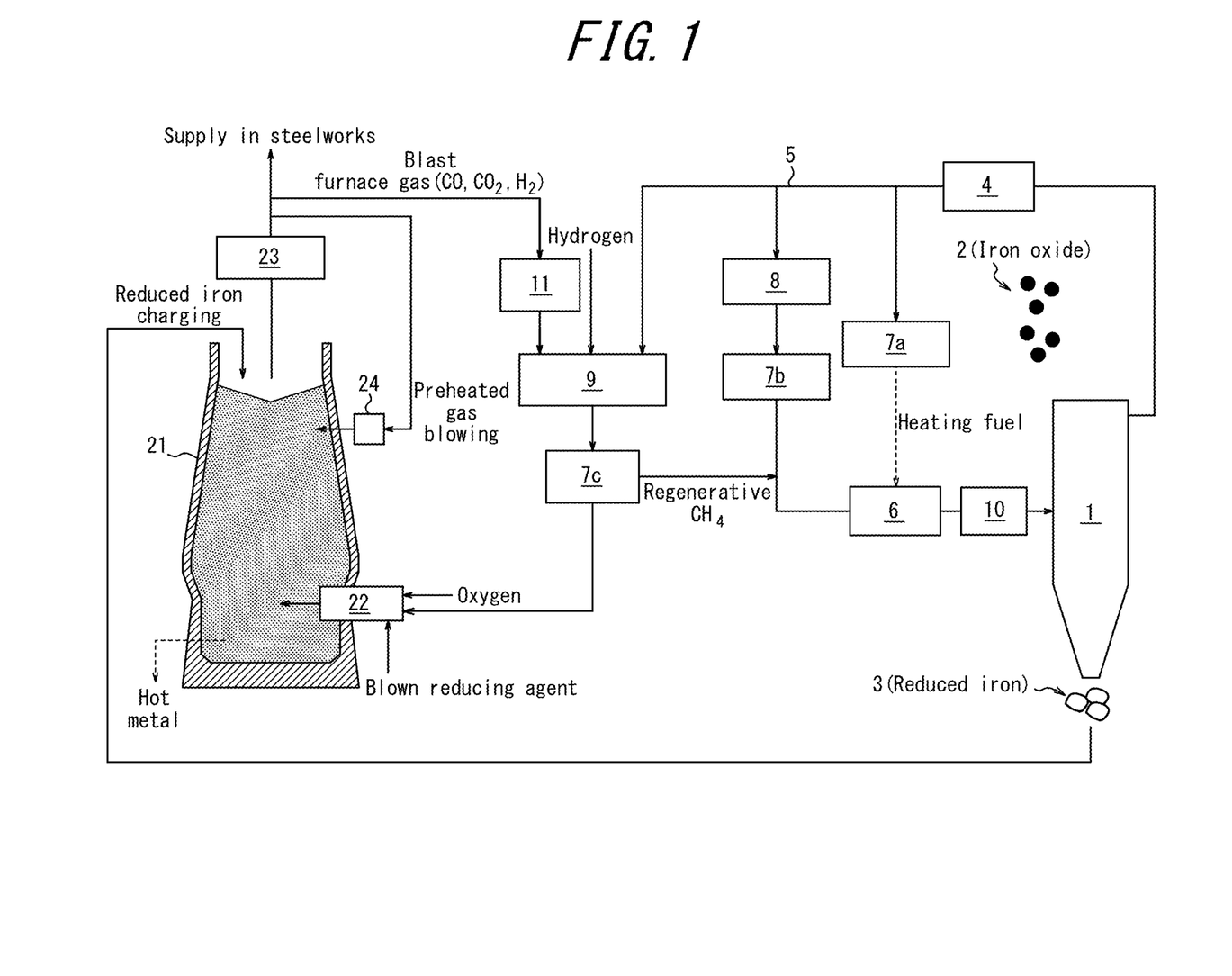
FIG. 1 is a schematic diagram illustrating our production line.

FIG. 1 illustrates an example of our steelmaking line. In FIG. 1, reference sign 1 is a reducing furnace, 2 is iron oxide, 3 is reduced iron, 4 is a dust remover for furnace top gas from the reducing furnace 1, 5 is a supply path of the furnace top gas, 6 is a heat-reformer that heats or heat-reforms methane gas from the below-described methane synthesizer and/or carbon monoxide gas to generate reducing gas containing carbon monoxide gas and hydrogen gas, 7a is a first dehydrator, 7b is a second dehydrator, 7c is a third dehydrator, 8 is a carbon dioxide separator that separates carbon dioxide from the furnace top gas, 9 is a methane synthesizer that synthesizes methane from the furnace top gas and/or blast furnace gas, and hydrogen, 10 is a reducing gas blower that supplies the reducing gas into the reducing furnace 1, 21 is a blast furnace, 22 is a methane blower (tuyere), 23 is a blast furnace-side dehydrator, and 24 is a burner.

Our method of producing reduced iron uses this steelmaking line partly or wholly to produce reduced iron according to various modes, and roughly comprises: charging iron oxide into the reducing furnace; blowing reducing gas into the reducing furnace; synthesizing methane from mixed gas containing carbon dioxide and carbon monoxide or carbon dioxide gas, and hydrogen gas; heating raw material gas including the methane gas and the mixed gas and reforming the raw material gas to the reducing gas; and reducing the iron oxide by the reducing gas in the reducing furnace. The "reducing furnace" herein denotes a process of reducing charged iron oxide raw material in a solid state and discharging reduced iron, and does not include a process of producing iron melted at high temperature as in a blast furnace.

Our method of producing reduced iron will be described in detail below by way of each of some disclosed embodiments.

Embodiment 1

Figure 2:
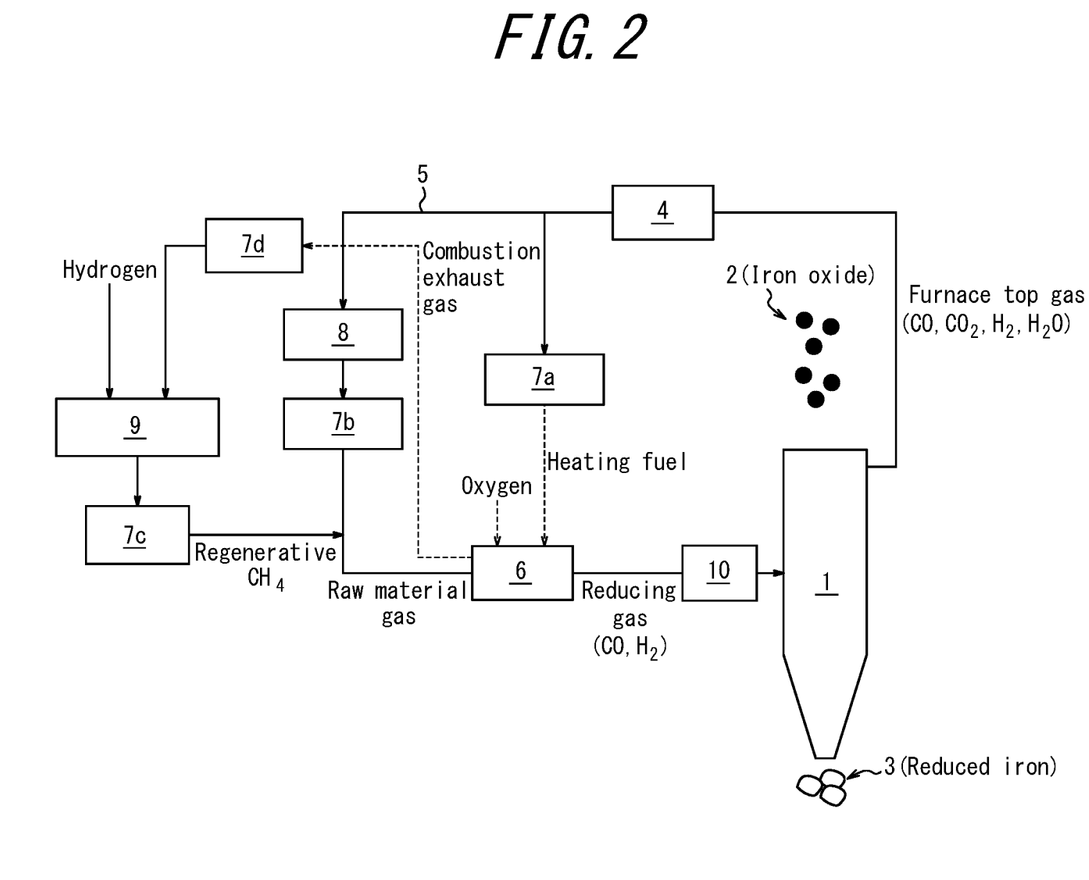
FIG. 2 is a schematic diagram illustrating a reduced iron production line in Embodiment 1.

Embodiment 1 will be described below, with reference to FIG. 2. FIG. 2 selectively illustrates the components used in Embodiment 1 from the components illustrated in FIG. 1. The steelmaking line illustrated in FIG. 1 is used in Embodiment 1.

In Embodiment 1, reduced iron is produced according to the following procedure: First, the iron oxide 2 is charged into the reducing furnace 1 which is central to the reduced iron production process from its upper part, and the iron oxide 2 is gradually lowered. While lowering the iron oxide 2, high-temperature reducing gas containing CO, $H_2$, and hydrocarbon is blown from the reducing gas blower 10 into the reducing furnace 1 at its intermediate part to reduce the iron oxide 2, and the reduced iron 3 is discharged from the lower part of the reducing furnace 1. In this reduction process in the reducing furnace 1, furnace top gas mainly containing CO, $CO_2$, $H_2$, and $H_2O$ is discharged from the upper part of the reducing furnace 1. The furnace top gas is subjected to dust removal in the dust remover 4. After this, part of the furnace top gas is moisture controlled in the second dehydrator 7b and fed into the heat-reformer 6 as raw material gas. The remaining furnace top gas is dehydrated in the first dehydrator 7a, and then used as heating fuel in a combustion chamber in the heat-reformer 6. As combustion-supporting gas when combusting the furnace top gas in the combustion chamber in the heat-reformer 6, not air but oxygen gas is preferably used to prevent nitrogen from being mixed in.

To heat the supplied furnace top gas in the heat-reformer 6 and generate high-temperature reducing gas, hydrocarbon gas for adjusting the furnace top gas components (CO, $CO_2$, $H_2$, and $H_2O$) to the reducing components (CO, $H_2$, and hydrocarbon) needs to be supplied into the heat-reformer 6 together with the furnace top gas. Conventionally, natural gas is supplied from outside as such hydrocarbon gas, as mentioned above. In Embodiment 1, it is important to use regenerative methane gas (regenerative $CH_4$ in FIG. 1) generated using the methane synthesizer 9 in the steelmaking line, instead of hydrocarbon gas supplied from outside such as natural gas.

As raw material for synthesizing the methane gas, hydrogen gas supplied from outside and gas containing CO, $CO_2$, and hydrocarbon are used. The gas containing CO, $CO_2$, and hydrocarbon may be any gas obtainable in the steelworks. In Embodiment 1, combustion exhaust gas from the combustion chamber in the heat-reformer 6 is used as illustrated in FIG. 2. In detail, combustion exhaust gas generated when combusting the furnace top gas in the combustion chamber in the heat-reformer 6 preferably together with oxygen gas as the combustion-supporting gas is dehydrated in the fourth dehydrator 7d and then supplied into the methane synthesizer 9 together with hydrogen, to synthesize methane. The synthesized regenerative methane is supplied into the heat-reformer 6 together with the furnace top gas as the raw material gas that has been moisture controlled in the second dehydrator 7b, and heated in the heat-reformer 6. The resultant high-temperature reducing gas is then supplied into the reducing furnace 1.

The furnace top gas used as the raw material gas is moisture controlled to appropriately adjust the composition of the reducing gas. The furnace top gas may also be subjected to $CO_2$ separation in the carbon dioxide separator 8. Although the regenerative methane and the furnace top gas are used as the raw material gas of the reducing gas, water or water vapor may be added for composition adjustment. A mechanism for promoting reaction, such as a catalyst, may be provided in the heat-reformer 6 to cause reforming reaction and generate reformed gas mainly containing CO and $H_2$. Alternatively, only heating may be performed in the heat-reformer and the heated gas may be directly blown into the reducing furnace. In the case of performing $CO_2$ separation, $CO_2$-rich gas after the separation can be used as the raw material gas in the methane synthesizer 9. The remaining gas including combustible gas such as CO may be used as fuel gas in the heat-reformer 6 or supplied to another process in the steelworks and used as fuel gas or the like.

As the hydrogen gas used to synthesize the regenerative methane, $CO_2$-free hydrogen supplied from outside, such as hydrogen gas generated by electrolyzing water by solar power, may be used. The oxygen gas used as the combustion-supporting gas in the combustion chamber in the heat-reformer 6 need not necessarily be pure oxygen with an oxygen concentration of 100%, and may contain a small amount of gas other than oxygen, such as nitrogen, carbon dioxide, and argon. If the oxygen concentration is excessively low, the gas volume increases, and the heat-reformer 6 and the methane synthesizer 9 for performing methane synthesis need to be increased in size. Therefore, the oxygen concentration is preferably 80% or more. In Embodiment 1, by using $CO_2$-free power for oxygen production and hydrogen production, $CO_2$ emissions can be in principle reduced to zero. Examples of the $CO_2$-free power that can be used include solar-generated power and nuclear-generated power.

Embodiment 2

Figure 3:
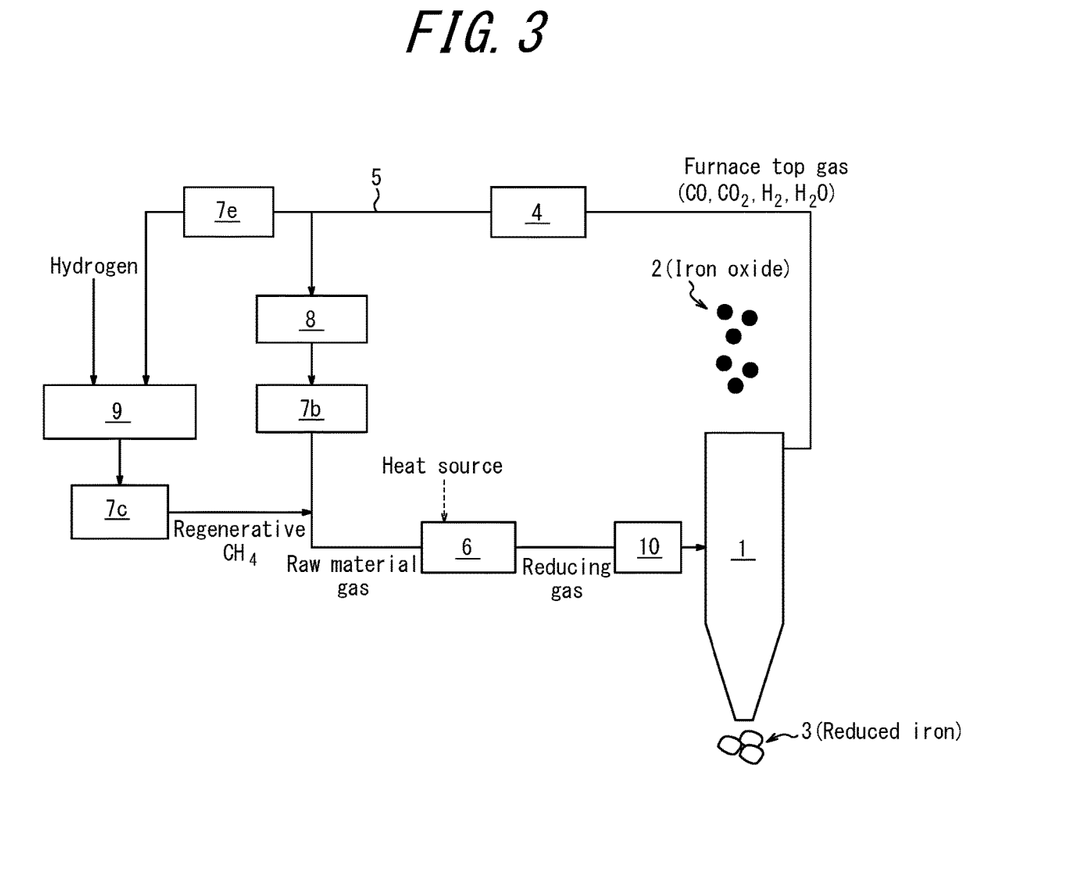
FIG. 3 is a schematic diagram illustrating a reduced iron production line in Embodiment 2.

Embodiment 2 is illustrated in FIG. 3. In Embodiment 2, of the furnace top gas generated from the reducing furnace 1, the furnace top gas used for heating in the heat-reformer 6 in Embodiment 1 is moisture controlled in a dehydrator 7e and then fed into the methane synthesizer 9 as raw material of regenerative methane gas (regenerative $CH_4$ in FIG. 3), to synthesize a necessary amount of regenerative methane for the heat-reformer 6. In the case where this causes lack of heating fuel in the heat-reformer 6, an external $CO_2$-free heat source, such as an external heat source for heating using $CO_2$-free power, may be used as a substitute. In Embodiment 2, by using $CO_2$-free power for heating in the heat-reformer 6 and hydrogen production, $CO_2$ emissions can be in principle reduced to zero.

In Embodiments 1 and 2 described above, if a small amount of unwanted gas, such as nitrogen gas for purging, other than CO, $CO_2$, $H_2$, $H_2O$, and hydrocarbon is mixed in, the unwanted gas gradually accumulates in the reduced iron production process and the reducing gas concentration decreases. In view of this, it is desirable to regularly monitor the nitrogen concentration in the system and, if the nitrogen concentration increases to a certain level, e.g. 20% or more, temporarily discharge, to outside the system, the furnace top gas or the combustion exhaust gas flowing into the methane synthesizer 9. Since the regenerative methane gas cannot be generated during this period, natural gas or the like may be temporarily blown into the heat-reformer 6 instead of the regenerative methane gas.

The hydrogen gas supplied from outside as raw material for methane synthesis is preferably produced by a method that causes as little $CO_2$ as possible. An example of such a method is electrolysis of water. The $H_2$ gas need not necessarily have a $H_2$ concentration of 100%, but higher $H_2$ concentration is better in order to maintain high methane concentration in the generated regenerative methane gas. The $H_2$ concentration is preferably 80 vol % or more.

Embodiment 3

Embodiment 3 will be described below, with reference to FIG. 1.

Embodiment 3 describes a method that is advantageous in the case of providing our reduced iron production process in a steelworks including a blast furnace for producing hot metal. In Embodiment 3, in the reduced iron production process, the furnace top gas discharged from the furnace top of the reducing furnace 1 is subjected to dust removal in the dust remover 4, and subsequently part of the furnace top gas is moisture controlled in the second dehydrator 7b and fed into the heat-reformer 6 as raw material gas and the remaining furnace top gas is dehydrated in the first dehydrator 7a and then used as heating fuel in the combustion chamber in the heat-reformer 6, as illustrated in FIG. 1 as an example.

Embodiment 3 has a feature that not only the furnace top gas used in Embodiment 2 but also the blast furnace gas discharged from the blast furnace 21 is used as raw material for methane synthesis in the methane synthesizer 9, instead of using the combustion exhaust gas from the heat-reformer 6 as in Embodiment 1. A blast furnace operation method in Embodiment 3 will be described below.

[Blast Furnace Operation Method]

In the blast furnace operation method in Embodiment 3, sintered ore, lump ore, or pellets (hereafter also referred to as "ore raw material") as raw material, coke, and the like are charged (not illustrated) into the blast furnace 21 from the furnace top. Moreover, blast gas, a reducing agent, and regenerative methane gas are blown into the blast furnace 21 from a blower (tuyere) 22 installed in the lower part of the blast furnace 21. The reducing agent blown into the blast furnace 21 from the blower 22 is also referred to as "blown reducing agent", to distinguish it from coke.

The ore raw material charged into the blast furnace 21 is then reduced by carbon monoxide gas and hydrogen gas generated as a result of the blast gas and the reducing agent reacting with each other. In the reduction of the ore raw material, carbon dioxide is generated, and discharged from the furnace top of the blast furnace as by-product gas together with carbon monoxide, hydrogen, etc. unreacted with the ore raw material. Since the furnace top of the blast furnace 21 is in high pressure conditions of about 2.5 atm, water vapor condenses as a result of expansion cooling when the blast furnace gas (by-product gas) discharged from the furnace top of the blast furnace returns to normal pressure, and the condensed water is removed in the dehydrator 23.

Following this, at least part of the blast furnace gas is introduced into the methane synthesizer 9. In the methane synthesizer 9, carbon monoxide and carbon dioxide contained in the blast furnace gas are reacted with hydrogen gas to generate methane ($CH_4$) gas. The methane gas obtained by the reaction of the blast furnace gas is referred to as "regenerative methane gas" (regenerative $CH_4$ in FIG. 1). As a result of cooling the obtained regenerative methane gas to normal temperature, water vapor in the regenerative methane gas is condensed, and the by-product water is removed in the third dehydrator 7c. The by-product water is preferably supplied to a water electrolyzer and used for water electrolysis, as mentioned above. At least part of the blast furnace gas supplied into the methane synthesizer 9 may not maintain the composition when discharged from the blast furnace. For example, carbon dioxide may be separated by a carbon dioxide gas separation and recovery device and the separated carbon dioxide alone may be supplied to the methane synthesizer.

The regenerative methane gas thus obtained is supplied into the heat-reformer 6 together with the furnace top gas as raw material gas, and heating is performed in the heat-reformer 6 to generate high-temperature reducing gas, which is then supplied to the reducing furnace 1.

Part of the regenerative methane gas is preferably supplied into the blower 22 as a blown reducing agent. By using the regenerative methane gas as the blown reducing agent, the usage of other blown reducing agents such as pulverized coal, waste plastic, and reducing gas such as hydrogen gas and carbon monoxide gas can be reduced. The total amount of the blown reducing agents including the regenerative methane gas and the other blown reducing agents blown into the blast furnace is preferably 150 kg/t or less. The unit "kg/t" expresses the amount of the other blown reducing agents blown into the blast furnace to produce 1 t of hot metal.

The hydrogen gas used to generate the regenerative methane gas is not limited to having a hydrogen concentration of 100 vol %, but preferably has high hydrogen concentration, specifically, a hydrogen concentration of 80 vol % or more, to achieve high methane concentration in the regenerative methane gas. The hydrogen concentration is more preferably 90 vol % or more, and further preferably 95 vol % or more. Examples of residual gases other than hydrogen include CO, $CO_2$, $H_2S$, $CH_4$, and $N_2$.

For example, at least part of the hydrogen gas used in the generation of the regenerative methane gas is preferably hydrogen gas generated by water electrolysis in the water electrolyzer. This is because: by-product water generated secondarily in the regenerative methane gas generation process can be used as water in the water electrolysis; and by-product oxygen gas generated secondarily in the water electrolysis can be used as oxygen gas serving as blast gas in the tuyere 22. Combining these features with the blast furnace operation conditions (i.e. use of oxygen gas as blast gas and use of regenerative methane gas as a reducing agent) can create a high-efficiency resource circulation system, and also improve the operation flexibility.

It is preferable to use the by-product water as the water used in the water electrolysis, as mentioned above. If there is lack of water, water is supplied from within the steelworks as appropriate.

Although it is preferable to use the whole amount of the by-product oxygen gas as oxygen gas serving as blast gas, the by-product oxygen gas may be supplied to another oxygen-use line (for example, a converter, an electric heating furnace, a combustion device (heating furnace burner, sintering ignition burner), etc.) depending on the supply amount.

It is preferable to use only the hydrogen gas generated in the water electrolysis as the hydrogen gas used in the generation of the regenerative methane gas. If there is lack of hydrogen gas, however, hydrogen gas is supplied from outside or from another line in the steelworks.

Examples of the hydrogen gas supply source in the steelworks include coke oven gas (by-product gas discharged from a coke oven). In the case of supplying hydrogen gas from the coke oven gas, for example, a method of separating and recovering hydrogen from the coke oven gas by physical adsorption (PSA) or the like or a method of reforming (partially oxidizing) hydrocarbon in the coke oven gas and separating and recovering hydrogen from the reformed gas by PSA or the like may be used.

Examples of the hydrogen gas supplied from outside include hydrogen gas obtained by reforming hydrocarbon such as natural gas by water vapor reforming or the like, hydrogen gas obtained by vaporizing liquefied hydrogen, and hydrogen gas obtained by dehydrogenating organic hydride.

The power used in the water electrolysis is not limited, but is preferably power derived from renewable energy or power generated in a power generation line in the steelworks.

In the case of using power derived from renewable energy, carbon dioxide emissions can be further reduced. The "renewable energy" herein denotes energy that constantly exists in the natural world, such as solar power, wind power, hydropower, geothermal power, and biomass.

In the case of using power generated in a power generation line in the steelworks, a more efficient resource circulation system can be created. Examples of the power generation line in the steelworks include a furnace top pressure power generation line for the blast furnace and a power generation line using blast furnace gas as fuel (heat source). In the power generation line using blast furnace gas as fuel (heat source), coke oven gas, converter gas (by-product gas discharged from the converter), or city gas may be used as fuel depending on the blast furnace operation state.

The blown reducing agent such as the regenerative methane gas and the oxygen gas are mixed in the blower 22, and the mixed gas rapidly ignites and gasifies immediately after being blown from the blower 22 into the blast furnace 21. Then, a raceway, i.e. a region in which the blown reducing agent such as the regenerative methane gas or the coke and the oxygen gas react with each other is formed in the part of the blast furnace ahead of the blower 22.

If the oxygen concentration in the blast gas increases, the amount of gas in the furnace decreases. This may cause insufficient heating of the charged material in the upper part of the blast furnace. In such a case, it is preferable to perform preheated gas blowing, i.e. partially combusting, by the burner 24, part of the blast furnace gas downstream of the dehydrator 23 to about 800° C. to 1000° C. and then blowing it into the blast furnace shaft portion, as illustrated in FIG. 1.

In Embodiment 3, it is important to use not hot air (air heated to about 1200° C.) but oxygen gas as the blast gas in the blower 22.

If hot air (air heated to about 1200° C.) is used as the blast gas, about 50 vol % of nitrogen, which does not contribute to combustion reaction, is contained in the combustion gas, which prevents the flame temperature in the raceway from reaching high temperature. In such a case, if most of the reducing agent blown into the blast furnace is changed from pulverized coal to methane gas, the tuyere-outlet temperature of the blower 22 decreases to below 2000° C. that is the lower limit of appropriate tuyere-outlet temperature, due to the difference between the reaction heat in the reaction between pulverized coal and oxygen and the reaction heat in the reaction between methane gas and oxygen. This causes operation troubles such as insufficient heating of the molten metal and slag in the lower part of the blast furnace, pressure loss increase, and tapping failure. Moreover, since a large amount of nitrogen is contained in the blast furnace gas, a process of separating nitrogen from carbon monoxide and carbon dioxide needs to be performed before the process of generating the methane gas from the blast furnace gas.

By using oxygen gas as the blast gas, nitrogen gas not contributing to combustion reaction can be prevented from being mixed in, so that the tuyere-outlet temperature can be increased to sufficiently high temperature. Since the flame temperature in the raceway can be increased to high temperature as compared with the case of using hot air, the tuyere-outlet temperature can be controlled to an appropriate range of 2000° C. to 2400° C. even in the case of blowing a large amount of methane from the tuyere as the reducing agent.

It is thus important to use oxygen gas as the blast gas in the blast furnace operation method in Embodiment 3.

By-product oxygen gas generated secondarily in the water electrolysis is preferably used as the oxygen gas serving as the blast gas, as mentioned above. A high-efficiency resource circulation system can thus be created. Oxygen gas other than the by-product oxygen gas may be, for example, produced by a cryogenic air separator.

The oxygen concentration in the oxygen gas is preferably 80 vol % or more. If the oxygen gas concentration is low, the amount of gas introduced into the blast furnace and the pressure loss in the blast furnace increase, which is likely to cause a decrease in productivity. Moreover, while repeatedly performing the gas circulation, the methane gas concentration in the regenerative methane gas decreases relatively. Therefore, the oxygen concentration in the oxygen gas is preferably 80 vol % or more. The oxygen concentration is more preferably 90 vol % or more, and further preferably 95 vol % or more. An oxygen concentration of 90% or more is particularly advantageous because the methane gas concentration in the regenerative methane gas can be kept high (about 90 vol %) without supplying external methane gas even in the case where operation is performed beyond a normal blast furnace operation period. The oxygen concentration may be 100 vol %.

The residual gas in the oxygen gas other than oxygen may contain nitrogen, carbon dioxide, etc., but the nitrogen content is preferably as low as possible. Blast furnace gas in a typical blast furnace contains approximately 50 vol % of nitrogen gas, which is not preferable because the methane concentration in the regenerative methane gas is likely to decrease. Blast furnace gas discharged from the blast furnace into which the oxygen gas is blown as blast gas is substantially composed of $CO$, $CO_2$ and $H_2$ with approximately zero nitrogen concentration, and accordingly is suitable for methane synthesis.

In the case of using part of the regenerative methane gas as the blown methane gas, the methane concentration is preferably 80 vol % or more. If the regenerative methane gas is insufficient, methane gas supplied from outside may be used.

If the methane concentration in the blown methane gas is low, the amount of gas blown into the blast furnace and the pressure loss in the blast furnace increase, which is likely to cause a decrease in productivity. Moreover, while repeatedly performing the gas circulation, the methane concentration in the regenerative methane gas decreases relatively. Therefore, the methane concentration in the blown methane gas is preferably 80 vol % or more. The methane concentration in the blown methane gas is more preferably 90 vol % or more, and further preferably 95 vol % or more. The methane concentration in the blown methane gas may be 100 vol %.

For the same reasons, the methane concentration in the regenerative methane gas (and external methane gas) is preferably 80 vol % or more. The methane concentration in the regenerative methane gas (and external methane gas) is more preferably 90 vol % or more, and further preferably 95 vol % or more. The methane concentration in the regenerative methane gas (and external methane gas) may be 100 vol %.

The residual gas in each of the blown methane gas and the regenerative methane gas (and external methane gas) other than methane may contain, for example, carbon monoxide, carbon dioxide, hydrogen, and hydrocarbon, and impurity gases such as nitrogen.

In the case where the methane concentration in the regenerative methane gas decreases, for example, the proportion of external methane gas having high methane concentration may be increased while decreasing the proportion of the regenerative methane gas in the blown methane gas. In this way, high methane concentration in the blown methane gas can be maintained.

In Embodiment 3 described above, the reduced iron 3 produced can be supplied into the blast furnace 21 as raw material. Consequently, the reducing agent rate in the blast furnace can be reduced, and also $CO_2$ emissions can be further reduced. In Embodiment 3, not only $CO_2$ emissions in the reduced iron production process can be in principle reduced to zero as in Embodiments 1 and 2, but also $CO_2$ emissions from the blast furnace can be reduced because $CO_2$ from the blast furnace is reused as regenerative methane gas.

Embodiment 4

Figure 4:
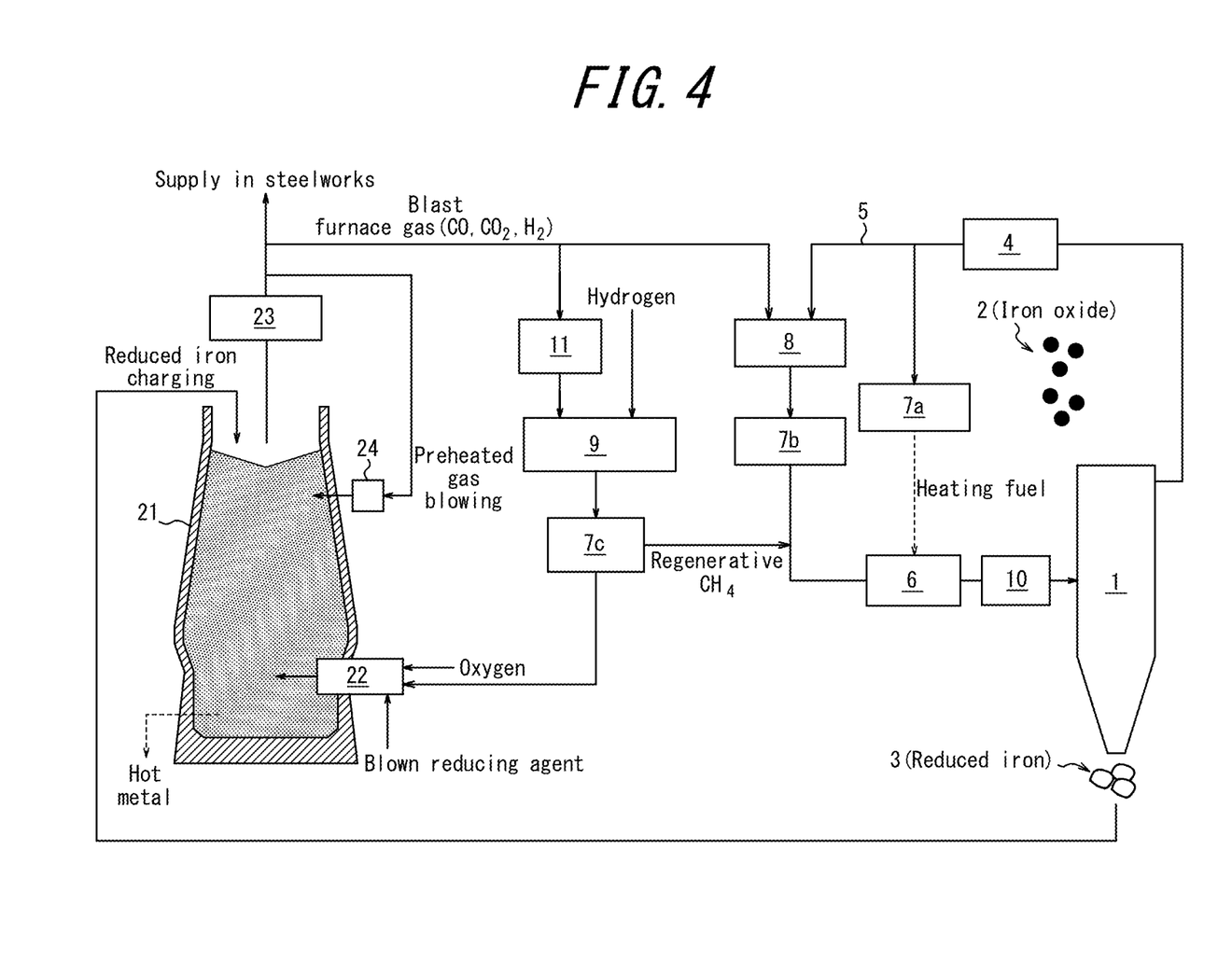
FIG. 4 is a schematic diagram illustrating a reduced iron production line in Embodiment 4.

Embodiment 4 will be described below, with reference to FIG. 4. FIG. 4 selectively illustrates the components used in Embodiment 4 from the components illustrated in FIG. 1. The steelmaking line illustrated in FIG. 1 is used in Embodiment 4.

In Embodiment 4, reduced iron is produced according to the following procedure: First, the iron oxide 2 is charged into the reducing furnace 1 which is central to the reduced iron production process from the upper part, and the iron oxide 2 is gradually lowered. While lowering the iron oxide 2, high-temperature reducing gas containing CO, $H_2$, and hydrocarbon is blown from the reducing gas blower 10 into the reducing furnace 1 at the intermediate part to reduce the iron oxide 2, and the reduced iron 3 is discharged from the lower part of the reducing furnace 1. In this reduction process in the reducing furnace 1, furnace top gas mainly containing CO, $CO_2$, $H_2$, and $H_2O$ is discharged from the upper part of the reducing furnace 1. The furnace top gas is subjected to dust removal in the dust remover 4. After this, part of the furnace top gas is subjected to carbon dioxide separation in the carbon dioxide separator 8, and then moisture controlled in the second dehydrator 7b and fed into the heat-reformer 6 as raw material gas. The remaining furnace top gas is dehydrated in the first dehydrator 7a, and then used as heating fuel in the combustion chamber in the heat-reformer 6. As the raw material gas, not only the furnace top gas discharged from the reducing furnace 1 but also the blast furnace gas discharged from the blast furnace 21 can be used.

The furnace top gas supplied into the heat-reformer 6 is then heated in the heat-reformer 6 together with the synthesized regenerative methane to generate high-temperature reducing gas.

The furnace top gas and the blast furnace gas used as the raw material gas are moisture controlled to appropriately adjust the composition of the reducing gas. The furnace top gas and the blast furnace gas may also be subjected to $CO_2$ separation in the carbon dioxide separator 8. Although the regenerative methane, the furnace top gas, and the blast furnace gas are used as the raw material gas of the reducing gas, water or water vapor may be added for composition adjustment. A mechanism for promoting reaction, such as a catalyst, may be provided in the heat-reformer 6 to cause reforming reaction and generate reformed gas mainly containing CO and $H_2$. Alternatively, only heating may be performed in the heat-reformer and the heated gas may be directly blown into the reducing furnace.

The blast furnace operation in Embodiment 4 is the same as that in Embodiment 3. At least part of the blast furnace gas is introduced into the methane synthesizer 9. In the methane synthesizer 9, carbon monoxide and carbon dioxide contained in the blast furnace gas are reacted with hydrogen gas to generate regenerative methane gas. The regenerative methane gas is supplied into the heat-reformer 6 together with the raw material gas, to generate the reducing gas in the heat-reformer 6. The remaining regenerative methane gas may be blown into the blast furnace from the tuyere as a reducing agent.

In the line illustrated in FIG. 4, a carbon dioxide gas separation and recovery device 11 for separating and recovering carbon dioxide gas from the blast furnace gas and a path for supplying the carbon dioxide gas recovered by the carbon dioxide gas separation and recovery device 11 to the methane synthesizer 9 may be provided upstream of the methane synthesizer 9. In this way, residual gas in the carbon dioxide gas separation and recovery device 11 containing fuel components such as carbon monoxide and hydrogen can be extracted and used as fuel in other processes in the steelworks, such as a coke oven or a power generator. Thus, our techniques can be implemented while supplying energy within the steelworks.

As the hydrogen gas used to synthesize the regenerative methane, $CO_2$-free hydrogen supplied from outside, such as hydrogen gas generated by electrolyzing water by solar power, may be used. The oxygen gas used as the combustion-supporting gas in the combustion chamber in the heat-reformer 6 need not necessarily be pure oxygen with an oxygen concentration of 100%, and may contain a small amount of gas other than oxygen, such as nitrogen, carbon dioxide, and argon. If the oxygen concentration is excessively low, the gas volume increases, and the heat-reformer 6 and the methane synthesizer 9 for performing methane synthesis need to be increased in size. Therefore, the oxygen concentration is preferably 80% or more. In Embodiment 1, by using $CO_2$-free power for oxygen production and hydrogen production, $CO_2$ emissions can be in principle reduced to zero. Examples of the $CO_2$-free power that can be used include solar-generated power and nuclear-generated power.

EXAMPLES

Examples will be described below. The following will describe operation specifications as consumption rates per 1 t of reduced iron (DRI) production. For example, for a reduced iron plant of 3000 t/day, multiplying the following specifications by 3000 yields specifications per 1 day.

Example 1

The following reducing furnace operation was performed using the reduced iron production line schematically illustrated in FIG. 2. 1394 kg/t of sintered ore was charged into the reducing furnace 1 from the upper part as the iron oxide 2, and 2200 $Nm^3$/t of high-temperature reducing gas ($H_2$: 62 vol %, CO: 38 vol %) heated to 800° C. was blown into the furnace 1 from the intermediate part. Then, 2200 $Nm^3$/t of furnace top gas ($H_2$: 46 vol %, CO: 29 vol %, $CO_2$: 10 vol %, $H_2O$: 15 vol %) was discharged from the upper part of the furnace 1. The furnace top gas was subjected to dust removal, and then 1501 $Nm^3/t$ of the furnace top gas was used as raw material gas and the remaining 699 $Nm^3/t$ furnace top gas was used as heating fuel gas in the heat-reformer 6. The furnace top gas as the raw material gas was moisture controlled to remove 86 kg/t of water, and then introduced into the heat-reformer 6. The furnace top gas as the heating fuel gas was dehydrated, and then combusted in the combustion chamber in the heat-reformer 6 using pure oxygen generated by a cryogenic separation process driven with $CO_2$-free power. The whole amount of exhaust gas from the combustion chamber in the heat-reformer 6 was recovered and dehydrated, and 269 $Nm^3/t$ of the resultant combustion exhaust gas ($CO_2$: 100 vol %) was fed into the methane synthesizer 9. 1075 $Nm^3/t$ of hydrogen generated by electrolysis using $CO_2$-free power was also added into the methane synthesizer 9, to synthesize 269 $Nm^3/t$ of regenerative methane gas. The synthesized regenerative methane gas was fed into the heat-reformer 6 together with the furnace top gas as the raw material gas, and used as raw material of reducing gas.

In this operation, no energy source was supplied from outside except hydrogen by $CO_2$-free power, so that $CO_2$ emissions were zero.

Example 2

The following reducing furnace operation was performed using the reduced iron production line schematically illustrated in FIG. 3. The conditions of sintered ore charged into the reducing furnace 1 reducing gas blown into the reducing furnace 1, furnace top gas discharged from the furnace top, and raw material gas were the same as those in Example 1. The remaining 699 $Nm^3/t$ furnace top gas other than the raw material gas was dehydrated and then fed into the methane synthesizer 9 as raw material for methane synthesis. 551 $Nm^3/t$ of hydrogen generated by electrolysis using $CO_2$-free power was also added into the methane synthesizer 9, to synthesize 269 $Nm^3/t$ of regenerative methane gas. The synthesized regenerative methane gas was fed into the heat-reformer 6 and used as raw material of reducing gas. Instead of the heating fuel supplied to the heat-reformer 6 in Example 1, $CO_2$-free power was supplied from outside, and electric heating was performed.

In this operation, no energy source was supplied from outside except hydrogen and electric heating by $CO_2$-free power, so that $CO_2$ emissions were zero.

Example 3

The following blast furnace and reducing furnace operation was performed using the steelmaking line schematically illustrated in FIG. 1. The reduced iron production process in Example 3 was similar to the reduced iron production process in Example 2, but not only furnace top gas but also blast furnace gas was used in the methane synthesizer 9. In the blast furnace 21, pure oxygen was used as blast gas to produce nitrogen-free blast furnace gas. 242 $Nm^3/t$ of the blast furnace gas ($H_2$: 24 vol %, CO: 33 vol %, $CO_2$: 43 vol %) generated under this condition was fed into the methane synthesizer 9 for methane synthesis together with 220 $Nm^3/t$ of the furnace top gas and 772 $Nm^3/t$ of hydrogen generated by electrolysis using $CO_2$-free power. 269 $Nm^3/t$ of regenerative methane gas was generated in the methane synthesizer 9. The regenerative methane gas was fed into the heat-reformer 6 together with the furnace top gas as the raw material gas, and used as raw material of reducing gas. Part of the regenerative methane gas was fed into the blower 22 in the blast furnace 21 as a blown reducing agent. Part of the furnace top gas of the reducing furnace was combusted as fuel in the combustion chamber in the heat-reformer 6, but the resultant exhaust gas was not recovered. To compensate for lack of fuel gas in the heat-reformer, $CO_2$-free power was supplied from outside (not illustrated), and electric heating was performed.

In this operation, the hydrogen gas charged into the methane synthesizer 9 for methane synthesis was generated by $CO_2$-free power, so that no $CO_2$ was generated in the hydrogen production. The combustion exhaust gas of the heat-reformer 6 was discharged to outside the system, and consequently 362 kg/t of $CO_2$ was generated. Meanwhile, since part of the blast furnace gas was recovered and reused as the regenerative methane gas, $CO_2$ from the blast furnace 21 was reduced by 362 kg/t. Hence, in the case of applying our reduced iron production process to a steelworks including an existing blast furnace, the operation in Example 3 achieved zero total $CO_2$ emissions, and reduced iron was able to be produced with substantially zero $CO_2$ emissions. Although the amount of the blast furnace gas supplied in the steelworks decreased due to the use of blast furnace gas in our reduced iron production process, given that the blast furnace gas is low in calory and therefore is hardly used in a heating furnace and the like in downstream processes and mainly used for power generation, the steelworks can be operated without a $CO_2$ increase by providing $CO_2$-free power to compensate for lack of power due to insufficient blast furnace gas supply in the steelworks.

Moreover, by feeding part of the regenerative methane gas into the tuyere 22 in the blast furnace 21 as the blown reducing agent, pulverized coal blown into the blast furnace 21 from the tuyere was able to be reduced, and thus further $CO_2$ reduction was achieved.

Furthermore, when blast furnace operation was performed by charging the reduced iron obtained in the foregoing reduced iron production process into the blast furnace 21 as raw material, the usage of coke in the blast furnace was able to be reduced, and further $CO_2$ reduction was achieved.

Comparative Example 1

Figure 5:
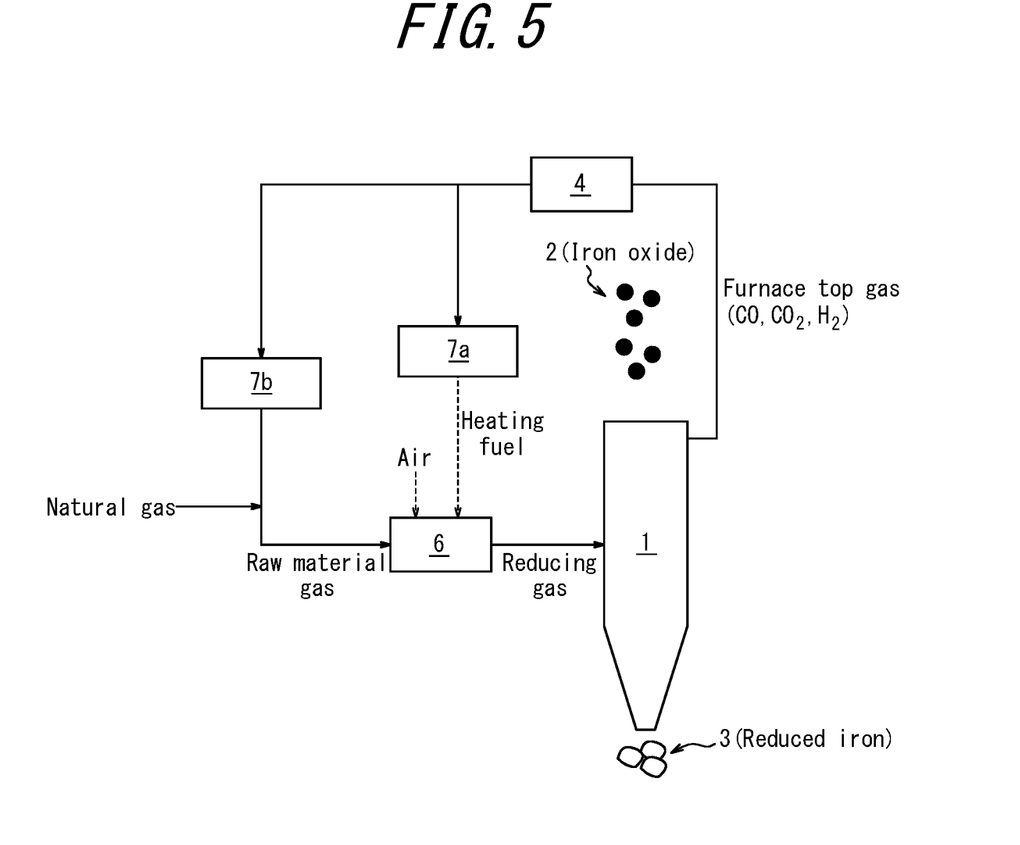
FIG. 5 is a schematic diagram illustrating a reduced iron production line in a comparative example.

A typical reducing furnace operation using a reduced iron production line illustrated in FIG. 5 was performed. The typical reducing furnace operation is Comparative Example 1 in which the raw material added to the furnace top gas as the raw material gas in Example 1 was not regenerative methane gas but natural gas. 2200 $Nm^3/t$ of high-temperature reducing gas ($H_2$: 62 vol %, CO: 38 vol %) heated to 800° C. was blown into the reducing furnace 1 from the intermediate part, and reducing furnace operation was performed. Then, 2200 $Nm^3/t$ of furnace top gas ($H_2$: 46 vol %, CO: 29 vol %, $CO_2$: 10 vol %, $H_2O$: 15 vol %) was discharged from the upper part of the furnace. The furnace top gas was subjected to dust removal, and then 1501 $Nm^3/t$ of the furnace top gas was used as raw material gas and the remaining 699 $Nm^3/t$ furnace top gas was used as heating fuel gas in the heat-reformer 6. The raw material gas was moisture controlled to remove 86 kg/t of water, and then fed into the heat-reformer 6. The heating fuel gas was dehydrated and then combusted in air in the combustion chamber in the heat-reformer 6, and the resultant combustion exhaust gas was diffused into the atmosphere. 269 $Nm^3/t$ of natural gas was fed into the heat-reformer 6 together with the foregoing process gas, to produce reducing gas.

In this operation, $CO_2$ emitted as the combustion exhaust gas of the heat-reformer 6 was converted to 528 kg-$CO_2$/t, and $CO_2$ emissions could not be reduced.

Comparative Example 2

Figure 6:
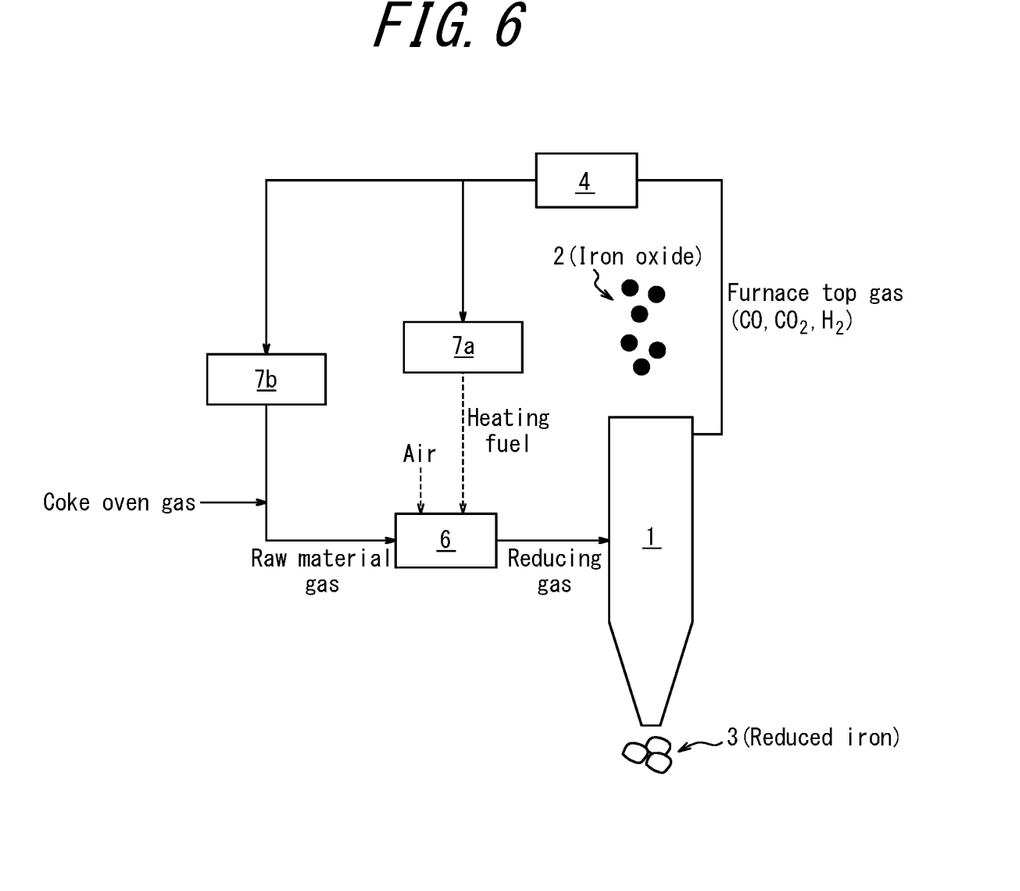
FIG. 6 is a schematic diagram illustrating a reduced iron production line in a comparative example.

A typical reducing furnace operation using a reduced iron production line illustrated in FIG. 6 was performed. The typical reducing furnace operation is Comparative Example 2 in which the raw material added to the furnace top gas as the raw material gas in Example 1 was not regenerative methane gas but coke oven gas. In Comparative Example 2, 524 $Nm^3$/t of coke oven gas was fed into the heat-reformer 6 to produce reduced iron, instead of natural gas in Comparative Example 1. $CO_2$ emitted as the combustion exhaust gas of the heat-reformer 6 was converted to 456 kg-$CO_2$/t, as in Comparative Example 1. However, since the coke oven gas used in the reduced iron process was part of coke oven gas generated in the steelworks, $CO_2$ emissions on the coke oven side were reduced by 456 kg-$CO_2$/t, so that the total $CO_2$ emissions in the steelworks were zero. Coke oven gas is, however, used as process gas in downstream processes unlike blast furnace gas, and accordingly cannot be substituted by $CO_2$-free power or hydrogen obtained by water electrolysis using $CO_2$-free power. Hence, with the method of Comparative Example 2, 284 $Nm^3$/t of external methane (such as natural gas) needed to be introduced in the downstream processes. This caused a $CO_2$ emission increase of 557 kg/t in the steelworks as a whole, and $CO_2$ emissions could not be reduced. Moreover, due to high sulfur content in the coke oven gas, a large-scale desulfurization line needed to be added because a reaction promoting catalyst provided in the heat-reformer was susceptible to sulfur.

The coke oven gas used in Comparative Example 2 is important process gas used as fuel in downstream processes, such as burner fuel in a heating furnace, in integrated steelworks. If such coke oven gas is used in the reduced iron process in a large amount, lack of fuel occurs in the downstream processes. Coke oven gas generated when producing coke in a steelworks including a blast furnace of 10000 t/day is 1690000 $Nm^3$/day. In the case where the amount of reduced iron produced is 3000 t/day, coke oven gas consumed in our reduced iron production process is 1570000 $Nm^3$/t. This means almost the whole amount of coke oven gas generated is used in our reduced iron production process. It is therefore impossible to apply the method of Comparative Example 2 to actual steelworks.

REFERENCE SIGNS LIST

1 reducing furnace
2 iron oxide
3 reduced iron
4 dust remover
5 supply path
6 heat-reformer
7a first dehydrator
7b second dehydrator
7c third dehydrator
7d fourth dehydrator
8 carbon dioxide separator
9 methane synthesizer
10 reducing gas blower
11 carbon dioxide gas separation and recovery device
21 blast furnace
22 blower
23 blast furnace-side dehydrator
24 burner

The invention claimed is:

1. A steelmaking line comprising:
a blast furnace configured to reduce iron oxide;
a reducing furnace configured to reduce iron oxide;
a methane synthesizer configured to synthesize methane from hydrogen gas and at least one of blast furnace gas and reducing furnace top gas, the blast furnace gas being generated from the blast furnace as a by-product and containing carbon dioxide, carbon monoxide, and hydrogen, and the reducing furnace top gas being discharged from a furnace top of the reducing furnace and containing carbon dioxide, carbon monoxide, and hydrogen;
a blower configured to blow the methane gas synthesized by the methane synthesizer into the blast furnace;
a heat-reformer configured to heat or heat-reform the methane gas synthesized by the methane synthesizer and at least one of the blast furnace gas and the reducing furnace top gas, to generate reducing gas containing carbon monoxide gas and hydrogen gas;
a reducing gas blower configured to blow the reducing gas into the reducing furnace; and
a supply path configured to supply the reducing furnace top gas to at least one of the methane synthesizer and the heat-reformer.

2. The steelmaking line according to claim 1, comprising a carbon dioxide separator configured to separate carbon dioxide from the reducing furnace top gas, in the supply path.

3. The steelmaking line according to claim 1, comprising:
a carbon dioxide gas separation and recovery device configured to separate and recover carbon dioxide gas from the blast furnace gas, on an upstream side of the methane synthesizer; and
a path configured to supply the carbon dioxide gas recovered by the carbon dioxide gas separation and recovery device, to the methane synthesizer.

4. A method of producing reduced iron using the steelmaking line according to claim 1, the method comprising:
charging iron oxide into the reducing furnace;
blowing reducing gas into the reducing furnace;
synthesizing methane from mixed gas or carbon dioxide gas, and hydrogen gas, the mixed gas containing carbon dioxide and carbon monoxide;
heating raw material gas including the methane gas and the mixed gas and reforming the raw material gas to the reducing gas; and
reducing the iron oxide by the reducing gas in the reducing furnace.

5. The method of producing reduced iron according to claim 4, wherein the mixed gas is at least one of blast furnace gas generated from the blast furnace as a by-product and reducing furnace top gas discharged from the furnace top of the reducing furnace.

6. The method of producing reduced iron according to claim 5, wherein part of the methane gas synthesized in the synthesizing is blown into the blast furnace.

7. The method of producing reduced iron according to claim 5, wherein oxygen gas is used for blasting in the blast furnace.

8. A method of producing reduced iron using the steelmaking line according to claim 1, the method comprising:
charging iron oxide into the reducing furnace;
blowing reducing gas into the reducing furnace;

separating carbon dioxide from reducing furnace top gas discharged from the furnace top of the reducing furnace and containing carbon dioxide, carbon monoxide, and hydrogen, and recovering mixed gas containing carbon monoxide and hydrogen;

heating raw material gas including the mixed gas to generate the reducing gas; and reducing the iron oxide by the reducing gas in the reducing furnace.

9. The method of producing reduced iron according to claim 8, wherein methane gas is used as part of the raw material gas.

10. The method of producing reduced iron according to claim 9, wherein the methane gas is regenerative methane gas obtained by synthesizing methane from hydrogen gas and at least one of part of the reducing furnace top gas and part of blast furnace gas, the reducing furnace top gas being discharged from the furnace top of the reducing furnace and containing carbon dioxide, carbon monoxide, and hydrogen, and the blast furnace gas being generated from the blast furnace as a by-product and containing carbon dioxide, carbon monoxide, and hydrogen, and part of the regenerative methane gas is blown into the blast furnace.

11. The method of producing reduced iron according to claim 10, wherein oxygen gas is used for blasting in the blast furnace.

* * * * *